United States Patent Office 3,282,773
Patented Nov. 1, 1966

3,282,773
ADHESIVE COMPOSITION AND METHOD OF BONDING USING α-CYANOACRYLATE ESTERS AND VINYL AROMATICS
Thomas H. Wicker, Jr., and Newton H. Shearer, Jr., Kingsport, Tenn., assignors to Eastman Kodak Company, Rochester, N.Y., a corporation of New Jersey
No Drawing. Filed July 20, 1961, Ser. No. 125,380
14 Claims. (Cl. 161—188)

This invention relates to new α-cyanoacrylate adhesive compositions and bonds formed therefrom. More particularly, our invention is concerned with adhesive formulations comprising monomeric esters of α-cyanoacrylic acid and vinyl aromatic compounds for bonding metallic or non-metallic surfaces to themselves or to each other and otherwise providing a superior bonded article.

Adhesive compositions comprising one or more monomeric esters of α-cyanoacrylic acid have been disclosed in patents of our co-workers and are well recognized to have utility in the bonding of a great variety of materials. For example, there is disclosed in U.S. Patent No. 2,974,788, in which one of us is a co-inventor, esters of α-cyanoacrylic acid having outstanding high-strength adhesive properties and which are extremely useful in bonding all kinds of articles such as glass, metals, plastics, rubber, wood, cement, paper, cloth, etc. to themselves or to each other. These α-cyanoacrylate esters may be represented by the general formula

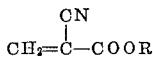

in which R is an alkyl group of 1–16 carbon atoms, a cyclohexyl group, a phenyl group, or an alkenyl group such as allyl or methallyl, etc. When applied in monomeric form on the surface to be bonded, they set up rapidly to give a high-strength adhesive bond between a variety of materials. Also one of our co-workers has disclosed in U.S. Patent No. 2,816,093 an adhesive composition comprising styrene in conjunction with methyl acrylate, ethyl α-cyanoacrylate and a polymerization catalyst.

After extended investigation we have now found that vinyl aromatic compounds such as monomeric styrene polymerize concomitantly with esters of α-cyanoacrylic acid without the need for catalyst, and yield bonds which have high tensile strength and excellent water resistance. Equimolar mixtures of an ester of α-cyanoacrylic acid and a vinyl aromatic compound such as styrene, substituted styrene, etc. will polymerize upon mixing without the presence of added catalyst, to give rapid high-strength bonding even of difficult surfaces. When these α-cyanoacrylate adhesive mixtures are applied to the same surface or to the other surface to be bonded, and the two surfaces brought together, a rapid high-strength bond having increased tensile strength and improved resistance to deterioration by water is obtained. Either of the constituents of our adhesive composition may be present in excess in the mixture, but a slight molar excess of the vinyl aromatic compound is preferred; although we do not wish to be bound by theoretical explanations of the mechanism, it appears that this molar excess leads to the unexpected and improved water resistance of the final adhesive bond.

It is an object of this invention to provide a novel composition and method of utilizing the adhesive action of such new α-cyanoacrylate adhesive compositions so that a firm bond occurs in a minimum of time. Another object is to provide an adhesive system which forms high-strength bonds in a short period of time between a variety of materials without the use of promoters, catalysts, or the use of clamping devices to hold the adherends in place. Another object of the invention is to provide high-strength bonds having improved water resistance, and to provide an adhesive system less expensive than that composed of 100% α-cyanoacrylic ester. A further object of the invention is to provide an adhesive system which is stable and which can be marketed and stored on dealer shelves for long periods of time without deterioration due to polymerization. Other objects will become apparent from the description and claims which follow.

Suitable adhesive compositions for practicing our invention comprise monomeric α-cyanoacrylic esters of the formula:

(1) 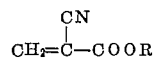

wherein R is an alkyl group of 1 to 16 carbon atoms, a cyclohexyl group, a phenyl group, or an alkenyl group such as allyl or methallyl, etc. and vinyl aromatic hydrocarbons of the type:

(2) 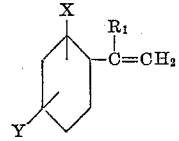

in which $R_1$ is hydrogen or methyl, X and Y may be halogen, lower alkyl, hydrogen, vinyl, or alkenyl substituents.

The lower alkyl α-cyanoacrylates are preferred because their bonding is more rapid than is that of the higher esters such as capryl α-cyanoacrylate. Vinyl aromatic compounds included within the scope of this invention include those which polymerize concomitantly and spontaneously with the α-cyanocrylates. The vinyl aromatic compounds do not normally polymerize without added catalyst, but in admixture with α-cyanoacrylate monomers the entire mixture polymerizes spontaneously without added initiation.

In commercial use, it has been the practice to stabilize such α-cyanoacrylate monomer compositions in order to prevent premature polymerization of the monomer. Such stabilization may be accomplished by incorporating therein phenolic inhibitors such as hydroquinone, t-butyl catechol, etc. Usually the monomer contains varying amounts (from about 0.001 to 0.10% by weight) of residual gaseous inhibitors such as sulfur dioxide, nitric oxide, and hydrogen fluoride which were originally introduced to prevent polymerization of the monomer during its manufacture and which produce an adequate shelf life for the final adhesive formulation. For more extensive stabilization, substantial amounts of residual acidic inhibitors such as sulfur dioxide, nitric oxide, hydrogen fluoride, organic acids or anhydrides, stannic chloride, ferric chloride, and other members of the class of so-called Lewis acids (I. M. Kolthoff, J. Phys. Chem., 48, pages 51–7, 1944) may have been added with or without phenolic inhibitors. However such stabilized compositions tend to be less active and a variety of promoters or catalysts for improving the set times of such compositions has been reported in the prior art.

We have now observed that, contrary to expectations, certain mixtures of the above α-cyanoacrylic esters and vinyl aromatic compounds polymerize spontaneously upon mixing and without added catalyst. Further, this polymerization occurs equally well even where up to several percent of acidic inhibitor has been incorporated into the monomeric α-cyanoacrylic ester for protection against premature polymerization.

Consequently these α-cyanoacrylates can be manufactured using relatively large amounts of sulfur dioxide or other acidic inhibitors and can be stored and used without the removal of said inhibitors. Since the polymerization of the α-cyanoacrylic ester in the system of our invention is not dependent upon a low concentration of an acidic inhibitor as described in the prior art, a very stable adhesive may be marketed.

Advantageously, the monomer components of our adhesive composition may be used alone or they may be thickened by incorporating therein a viscosity regulator such as a polymeric α-cyanoacrylate, a polyacrylate, a polymethacrylate, a cellulose ester, dissolved in the α-cyanoacrylate, or a poly(vinyl aromatic compound) dissolved in the vinyl aromatic component, in an amount up to 25% by weight based upon the total composition weight. A plasticizer may also be advantageously added to our composition in an amount of from 1 to 20% based on the total weight of the composition; particularly suited as plasticizers are monofunctional aliphatic esters, difunctional aliphatic or aromatic esters, phosphate esters, phosphonate esters, or the like.

Thus, one illustration of an adhesive composition for use in our invention has the following weight composition:

MIXTURE A

92% methyl α-cyanoacrylate containing 0.01% hydroquinone plus a variable amount of sulfur dioxide (0.001 to 0.10%)
5% poly(methyl methacrylate)
3% dimethyl sebacate

MIXTURE B

100% α-methylstyrene

In the broader practice of our invention, the α-cyanoacrylic ester (Mixture A) can be applied to one surface to be bonded and the vinyl aromatic compound (Mixture B) can be applied to the other surface, or the two components can be mixed prior to application. The pot life of the combined mixtures varies, but it is usually in the order of 10 to 30 minutes and may be varied by change of concentration, size of mix, and temperature. In the preferred embodiment of our invention, the reaction components are present in approximately equimolar proportions, but the invention is operable over the 25/75 to 75/25 range in molar ratios of α-cyanoacrylate to vinyl aromatic compound. In any case a rapid and strong bond results as soon as the two surfaces to be bonded are brought into contact. Alternatively, as mentioned above, the two components of the adhesive may be mixed immediately prior to use.

The following examples will further illustrate the manner of practicing our invention. It will be understood, however, that these examples are included to illustrate certain preferred embodiments of our invention and are not intended to limit the scope of the invention as defined herein unless specifically indicated.

*Example 1*

This example illustrates the rapid polymerization of a mixture of methyl α-cyanoacrylate and styrene.

(a) To 1.11 g. (0.01 m.) of methyl α-cyanoacrylate containing 100 p.p.m. sulfur dioxide in a small vial was added 1.04 g. (0.01 m.) of styrene monomer. The mixture began to polymerize immediately as shown by the gradual heating up and an increase in viscosity. The mixture had become very viscous within 15 minutes and within 30 minutes had set to a solid polymer.

(b) Experiment (a) was repeated with the exception that a drop of the above mixture was removed two minutes after mixing and placed between two steel tensile specimens. A bond unbreakable by manual pressure had formed within two minutes and a bond strength of 1900 p.s.i. was obtained after a 24-hr. cure at room temperature.

The above results appear to clearly illustrate the effectiveness of the adhesive mixtures of this invention in the bonding of metallic surfaces.

*Example 2*

A mixture of 1.11 g. (0.01 m.) of methyl α-cyanoacrylate and 1.18 g. (0.01 m.) of α-methylstyrene was prepared and a steel-steel bond was formed by placing one drop of this mixture between two steel surfaces (1 sq. in.). The bond could not be pulled apart after a 2.5 minute set time.

The above experiment was repeated using a mixture of 0.0075 m. of methyl α-cyanoacrylate and 0.0025 m. of α-methylstyrene. A bond formed between two aluminum surfaces which could not be pulled apart after a three minute set time.

*Example 3*

A mixture of 1.11 g. (0.01 m.) of methyl α-cyanoacrylate and 1.18 g. (0.01 m.) of p-vinyl toluene was prepared. One drop of this mixture was placed between two plane aluminum surfaces (1 sq. in.). After curing 3 minutes the two pieces of aluminum could not be pulled apart with manual pressure.

*Example 4*

A mixture of 2.09 g. (0.01 m.) of 2-ethylhexyl α-cyanoacrylate and 1.14 g. (0.011 m.) of styrene monomer was prepared in a small vial. One drop of this mixture was placed between two surfaces of plate glass (1 sq. in.). A bond which was unbreakable by manual pressure had formed within 10 seconds.

*Example 5*

A mixture of 1.11 g. (0.01 m.) of methyl α-cyanoacrylate and 1.38 g. (0.01 m.) of o-chlorostyrene monomer was prepared and one drop of the mixture was placed between two steel surfaces (1 sq. in.). A bond which was manually unbreakable had formed within 3 minutes.

*Example 6*

A mixture of 1.11 g. (0.01 m.) of methyl α-cyanoacrylate and 1.73 g. (0.01 m.) of 2,4-dichlorostyrene was prepared and one drop of the mixture was placed between two precleaned aluminum surfaces (1 sq. in.). A bond which could not be broken by manual pressure formed within five minutes.

Repetition of the above experiment using a pre-mixed adhesive consisting of 0.0025 m. of methyl α-cyanoacrylate and 0.0075 m. of 2,4-dichlorostyrene on precleaned steel surfaces gave a manually unbreakable bond after four minutes set time.

*Example 7*

A mixture of 1.11 g. (0.01 m.) of methyl α-cyanoacrylate and 1.32 g. (0.01 m.) of 2,4-dimethylstyrene was prepared in a clean glass vial. One drop of this mixture was placed between two steel surfaces (1 sq. in.). A bond which was unbreakable by manual pressure had formed within three minutes.

*Example 8*

A mixture of 1.11 g. (0.01 m.) of methyl α-cyanoacrylate, 0.988 g. (0.0095 m.) of styrene monomer, and 0.065 g. (0.0005 m.) of divinylbenzene was prepared in a small vial. The mixture was checked as an adhesive by placing one drop between two steel adherends (1 sq. in.). The resulting bond was unbreakable by manual pressure after two minutes' cure time.

*Example 9*

On one steel tensile specimen was placed one drop of methyl α-cyanoacrylate monomer. On another steel tensile specimen was placed one drop of monomeric styrene. The tensile test bond was formed by bringing the two tensile specimens together with a swirling motion. After the bond had cured for 24 hr. at room temperature, it was broken in tension on a Baldwin Southwark testing machine indicating a bond strength of 1800 p.s.i.

Example 10

On a steel specimen ¼" x 1" x 3" was placed one drop of neopentyl α-cyanoacrylate. On a similar piece of steel was placed one drop of α-methylstyrene. The two specimens were brought together so that there was a one inch overlap and the bond was formed, the two drops being mixed with a gentle swirling motion. Within three minutes a strong bond had formed which was not breakable by manual pressure.

Example 11

An equimolar mixture of methyl α-cyanoacrylate and styrene was prepared in a small vial as described in Example 1. After two minutes, five steel-steel tensile bonds were prepared from the mixture, cured 24 hr. at room temperature and then 24 hr. at 75° C. The bonded specimens were then placed in water at 75° C. for aging. The bonds remained intact during an observation period of 750 hrs.

A similar set of bonds was prepared using methyl α-cyanoacrylate alone as the adhesive. These bonds came apart within 600 hrs. when cured as described above and subjected to a water stability test at 75° C.

Using the foregoing procedures, bonds were formed between rubber and glass, glass and aluminum, maple wood and aluminum, two pieces of polyester plastic, felt and leather, and a variety of other adherend combinations.

The following example illustrates the superior water resistance of the 1:1 styrene/methyl α-cyanoacrylate copolymer compared with the methyl α-cyanoacrylate homopolymer.

Example 12

(a) An equimolar mixture of methyl α-cyanoacrylate and styrene was prepared in a small vial as described in Example 1. The polymerization was allowed to go to completion and was finished off by heating at 60° C. for 15 hrs. The resulting polymer was dissolved in chloroform and then precipitated into diethyl ether after filtration through a fine fritted glass funnel. The inherent viscosiy of the polymer was 2.30. This polymer was heated in water at reflux for 24 hrs. with no decrease in inherent viscosity. No carbon dioxide was evolved from the polymer during this period, indicating that no breakdown of the copolymer occurred.

(b) A polymer of methyl α-cyanoacrylate was prepared by the 2,2'-azobis-(2-methylpropionitrile) catalyzed initiation of the monomer in bulk at 60° C. The inherent viscosity of the polymer was 1.80. During a period of eight hours while this polymer was heated in water at reflux, the inherent viscosity decreased from 1.80 to 0.28. Carbon dioxide evolved during this period indicated that the polymer was 28% decarboxylated.

The following example illustrates the use of solutions of vinyl aromatic hydrocarbons as promoters for α-cyanoacrylate adhesive compositions in bonding aluminum-glass surfaces.

Example 13

On a plane glass surface was placed one drop of methyl α-cyanoacrylate. A 30% chloroform solution of monomeric styrene was placed on a similar aluminum surface, and after the solvent had evaporated, the two specimens were brought together. The resulting bond was formed within 10 seconds.

In a similar manner, bonds were prepared between two pieces of maple wood using methyl α-cyanoacrylate and a 1% solution of monomeric styrene.

From the preceding description and examples, it can readily be seen that the procedure of this invention employing vinyl aromatic compounds gives unexpected bonding of surfaces when employed in combination with α-cyanoacrylic esters. Strong bonds are obtained in short time with reproducible results. The method of our invention can be employed with advantage in the bonding of materials such as metals, rubber, plastics, textiles, paper and the like. Dissimilar materials such as different metal surfaces, etc. can also be bonded by the method of this invention.

Similar advantageous results are obtained with other combinations of monomers over the range of proportions as described. Usually the single α-cyanoacrylic ester is used in conjunction with a vinyl aromatic compound, although mixtures of two or more said esters may be employed as well as mixtures of two or more such vinyl aromatic compounds.

Although our invention has been described in considerable detail with particular reference to certain preferred embodiments thereof, variations and modifications can be effected within the spirit and scope of the invention as described hereinabove and as defined in the appended claims.

We claim:
1. An adhesive composition comprising a mixture of a monomeric α-cyanoacrylate ester consisting of up to 50% by weight of a monomeric ester of α-cyanoacrylic acid from the class having the formula:

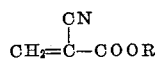

wherein R is a member of the group consisting of alkyl groups of 1–8 carbon atoms, cyclohexyl groups, phenyl groups, and alkenyl groups, and at least over 50% by weight of a monomeric vinyl aromatic hydrocarbon from the class having the formula:

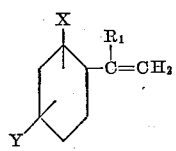

in which $R_1$ is a member of the group consisting of hydrogen and methyl, and X and Y are alike or different and are members of the group consisting of chlorine, lower alkyl, hydrogen, vinyl and alkenyl.

2. An adhesive composition according to claim 1 wherein the α-cyanoacrylic acid ester is methyl α-cyanoacrylate and the vinyl aromatic hydrocarbon is α-methylstyrene.

3. An adhesive composition according to claim 1 wherein the α-cyanoacrylic acid ester is 2-ethylhexyl α-cyanoacrylate and the vinyl aromatic hydrocarbon is α-methylstyrene.

4. An adhesive composition according to claim 1 wherein the α-cyanoacrylic acid ester is neopentyl α-cyanoacrylate and the vinyl aromatic hydrocarbon is α-methylstyrene.

5. An adhesive composition according to claim 1 wherein the α-cyanoacrylic acid ester is methyl α-cyanoacrylate and the vinyl aromatic hydrocarbon is 2,4-dichlorostyrene.

6. An adhesive composition according to claim 1 wherein the α-cyanoacrylic acid ester is methyl α-cyanoacrylate and the vinyl aromatic hydrocarbon is styrene monomer.

7. The composition of claim 1 wherein at least one of the groups X and Y is a member which will produce crosslinking.

8. The method of bonding two surfaces together in a quick and lasting bond which comprises coating one of the surfaces to be bonded with an adhesive composition of a monomeric ester of α-cyanoacrylic acid of the formula:

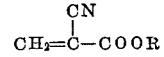

wherein R is selected from the group consisting of alkyl groups of 1–8 carbon atoms, cyclohexyl groups, phenyl groups, and alkenyl groups; coating the other surface to be bonded with a monomeric vinyl aromatic hydrocarbon having the formula:

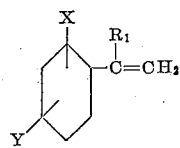

wherein $R_1$ is a member selected from the group consisting of hydrogen and methyl and X and Y are selected from the group consisting of chlorine, lower alkyl, hydrogen, vinyl, and alkenyl; and thereafter placing together the two surfaces to be bonded, and bonding them together within a few minutes.

9. The product formed by the process of claim 8.

10. The method of claim 8 wherein X and Y are selected from the group consisting of chlorine, lower alkyl, hydrogen, vinyl, and alkenyl and wherein at least one of the groups X and Y is a member which will produce crosslinking.

11. The method of claim 8 wherein the monomeric vinyl arromatic hydrocarbon is alpha-methylstyrene and wherein the monomeric α-cyanoacrylic ester contains a polymerization inhibitor.

12. A bonded article according to claim 8 wherein the surfaces which are to be bonded are selected from the group consisting of steel, aluminum, glass, wood, felt, and leather.

13. The method of strongly bonding a material with a quick and lasting bond comprising coating the surface to be bonded with a monomeric vinyl aromatic hydrocarbon of the formula:

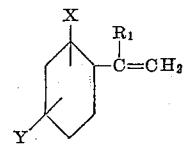

wherein $R_1$ is from the group consisting of hydrogen and methyl and X and Y are selected from the group consisting of chlorine, lower alkyl, hydrogen, vinyl and alkenyl; applying an adhesive composition comprising a monomeric lower alkyl-alpha cyanoacrylate to the monomeric vinyl aromatic hydrocarbon coated surface, said adhesive composition containing a polymerization inhibitor, and bringing the resulting coated surface into contact with the material being bonded thereto, and bonding said materials by polymerization, said polymerization being promoted by said monomeric vinyl aromatic hydrocarbon.

14. The method of strongly bonding a material with a strong and lasting bond comprising coating the surface of the material to be bonded with a monomeric lower alkyl alpha-cyanoacrylate, said adhesive composition containing a polymerization inhibitor; applying a monomeric vinyl aromatic hydrocarbon of the formula:

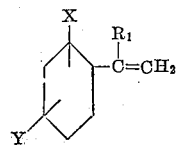

wherein $R_1$ is from the group consisting of hydrogen and methyl, and X and Y are selected from the group consisting of chlorine, lower alkyl, hydrogen, vinyl and alkenyl, to said adhesive coated surface; and bringing the resulting coated surface into contact with the material being bonded thereto, and bonding said materials by polymerization, said polymerization being promoted by said monomeric vinyl aromatic hydrocarbon.

References Cited by the Examiner

UNITED STATES PATENTS

| | | | |
|---|---|---|---|
| 176,428 | 4/1876 | Daniels | 154—46 |
| 2,651,589 | 9/1953 | Shokal et al. | 154—43 X |
| 2,816,093 | 12/1957 | Coover | 260—78.5 |
| 2,817,620 | 12/1957 | Golick et al. | 154—118 |

EARL M. BERGERT, *Primary Examiner.*

ALEXANDER WYMAN, J. M. DULIN,
J. P. MELOCHE, *Assistant Examiners.*